United States Patent [19]
Wootton et al.

[11] Patent Number: 5,332,176
[45] Date of Patent: Jul. 26, 1994

[54] CONTROLLED INTERLACE FOR TOW MISSILES USING MEDIUM WAVE INFRARED SENSOR OR TV SENSOR

[75] Inventors: John R. Wootton; Gary Waldman, both of St. Louis; Gregory L. Hobson, St. Peters, all of Mo.

[73] Assignee: Electronics & Space Corp., St. Louis, Mo.

[21] Appl. No.: 984,966

[22] Filed: Dec. 3, 1992

[51] Int. Cl.$^5$ .............................................. G01B 11/26
[52] U.S. Cl. ................................... 244/3.11; 364/516; 382/48; 382/10
[58] Field of Search ............... 382/1, 10, 36, 48; 244/3.11, 3.12, 3.13, 3.14, 3.15, 3.16; 367/131, 135; 364/516, 517

[56] References Cited
U.S. PATENT DOCUMENTS

| | | | |
|---|---|---|---|
| 4,497,065 | 1/1985 | Tisdale et al. | 244/3.15 |
| 5,062,586 | 11/1991 | Hobson et al. | 244/3.12 |

Primary Examiner—Daniel T. Pihulic
Attorney, Agent, or Firm—Polster, Lieder, Woodruff & Lucchesi

[57] ABSTRACT

Apparatus (10) is provided for detecting an object (B) such as a xenon beacon on a missile (M) located within a defined field of view (FOV). The field of view is defined by an array (A) of pixels (P). A sensor (14) includes a detector (16) which repetitively scans the field of view to detect the presence of an object therein. The output of the sensor is converted for use in activating pixels in the array in response to the detection of the object. A processor (22), in response to the presence of the object, defines a pixel matrix within the array. This matrix includes the pixel for the detected object signature. The processor searches all the pixels within the matrix to identify a signature which matches a predetermined characteristic of the object. Identification of such a signature, helps particularly identify the object in the field of view. The processor then focuses on this pixel set, during subsequent scans, to track the object.

28 Claims, 2 Drawing Sheets

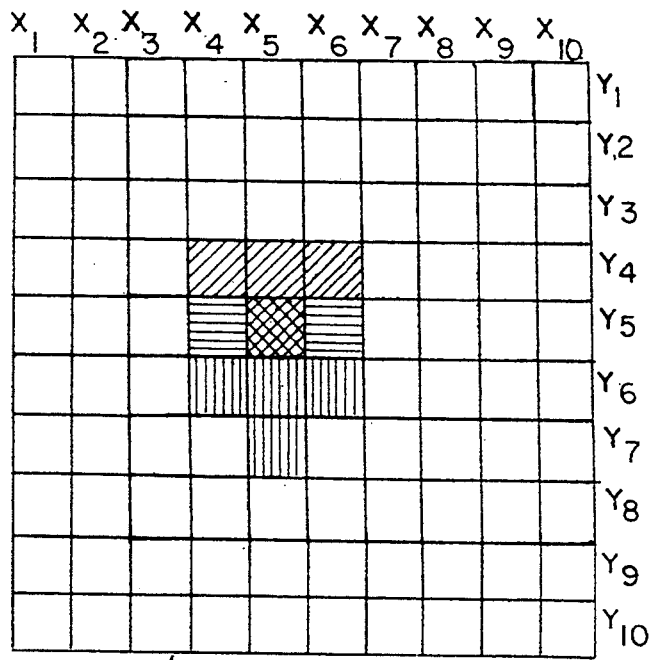
FIG. 3.
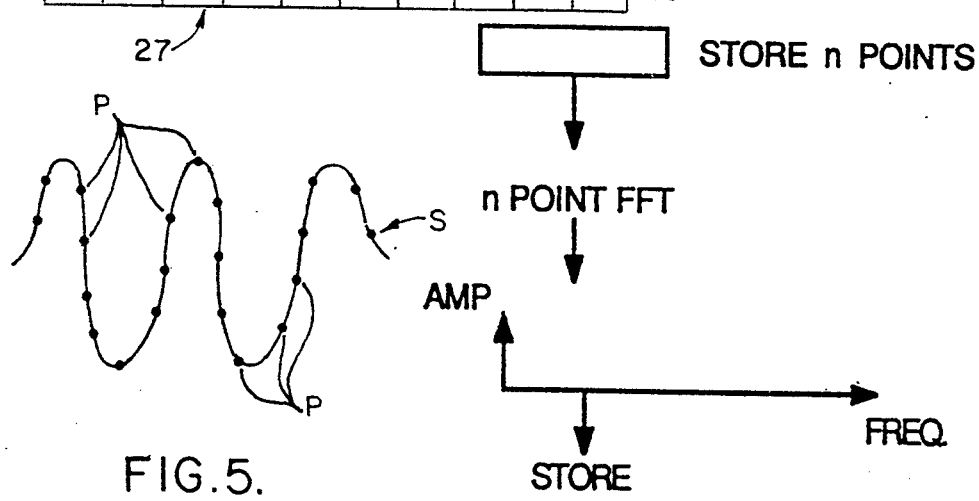
FIG. 5.
FIG. 4.

CONTROLLED INTERLACE FOR TOW MISSILES USING MEDIUM WAVE INFRARED SENSOR OR TV SENSOR

BACKGROUND OF THE INVENTION

This invention relates to TOW missile systems and, more particularly, to an improved system for locating a target within the TOW missile's target acquisition sensor's field of view.

Current TOW missile systems use a xenon beacon incorporated within the missile as a way of locating the beacon's (and hence the missile's) position. For target tracking and missile guidance purposes, the missile's position is located within the system's target acquisition sensor's field of view. The sensor is typically a xenon beacon tracker (XBT). Recent improvements in TOW missile systems include, for example, a new tracker which allows the user to simultaneously view both the missile and the target, this being done in the long infrared portion (8-12 microns) of the light spectrum. This improvement is shown and discussed in U.S. Pat. No. 5,062,586 which is assigned to the same assignee as the present invention. These systems are limited in that the xenon beacon tracker only sees the beacon. It does not see the target. Consequently, the tracker is boresighted with a television camera, or forward looking infrared receiver (FLIR). The FLIR, which is also part of the tracking system, can see the target. If the beacon tracker and FLIR are not boresighted, tracking errors may develop which could cause the missile to miss its target. It would therefore be advantageous to have a single sensor capable of seeing both the target and the xenon beacon simultaneously, since this would alleviate the need for boresighting the two separate sensors.

In the newer tracking systems there is a trend to remove hard optics from the system. One reason for this is a growing concern over laser hardness and safety. Using a single sensor capable of both visually sighting a target and tracking a xenon beacon, creates additional system advantages. Conventional detection arrays of charge coupled devices (CCD's), CID's, and even tube cameras, have their sensitivity extended so they can work in the near infrared (IR) portion of the light spectrum. Similarly, medium range IR sensors; i.e., those operating in the range of 3-5 microns, can have their range extended toward the lower, longer visible wavelength end of the spectrum. Now, they can also sense the near IR signature of a xenon beacon.

A xenon beacon is identifiable by a high-frequency modulation. Sensing this modulation helps distinguish the beacon from countermeasures such as decoys or flares used by an enemy. Currently available sensors have frame rates of 30 Hz., and field rates of 60 Hz., for example, there being two scans per frame. Photosensitive diodes such as those used in CCD or CID cameras, or in starring focal plane cameras, have a 1 MHz., or greater, intrinsic bandwidth. While scanning and addressing these diodes produces the 30 Hz. frame rate; in diode arrays, local addressing rates can exceed 1 MHz. The problem heretofore has been the ability to achieve this high frequency operation in a sensor operating in this 30-60 Hz. frequency range.

A further consideration with respect to these prior art systems and their problems is one of target detection and recognition. Target detection means sensing that something is in the sensor's field of view; while target recognition is determining what it is. In battlefield situations, the ability to spot a potential threat at the farthest possible range and immediately identify it as a threat or otherwise cannot be understated.

SUMMARY OF THE INVENTION

Among the several objects of the present invention is the provision of apparatus for augmenting the acoustic signature for an IR camera thereby to increase the range of its performance within the light spectrum; the provision of such apparatus useful in munitions systems such as TOW missile tracking systems to increase the effective range of such systems while simplifying their operation; the provision of such apparatus in which a separate xenon beacon tracker can be eliminated thereby to reduce system cost and as well as the need to boresight the tracker with other optical components of the system; the provision of such apparatus for use with a TOW missile tracker such as disclosed in U.S. Pat. No. 5,062,586 in which an "area of interest" within a field of view is selected, the area selected being that including a xenon beacon on the missile; the provision of such apparatus in which specific diodes, or arrays of diodes within the diode display comprising a field of view are addressable, the provision of such apparatus to process information from that address or array to determine whether or not a xenon beacon is present within the portion of the field of view represented thereby; the provision of such apparatus to detect a the beacon at a maximum range and to distinguish it from among other objects located at substantially the same range, this range being greater than that at which detection and recognition is currently possible; the provision of such apparatus employing a stand alone, non-imaging system; the provision of such apparatus employing medium wavelength infrared sensors whose range is extensible into the near infrared portion of the light spectrum; and, the provision of such apparatus to employ an array of pixels by which a visual display of a field of view is generated, and to perform target identification even when an object subtends but a single pixel, thereby maximizing the range of the apparatus.

In accordance with the invention, generally stated, apparatus is provided for detecting an object such as an enemy vehicle, helicopter, etc.,located within a defined field of view. The field of view is defined by an array of pixels. A sensor repetitively scans the field of view to detect the presence of an object therein. The output of the sensor is converted for use in activating pixels in the array in response to the. A processor searches all the pixels within the array to identify a signature which matches a predetermined characteristic of the object. Identification of such signature, even by a single pixel signifies the presence of the object in the field of view. The processor further, in response to the presence of the object, defines a set of pixels within the array which includes the pixel having the object's signature. The processor then focuses on this pixel set, during subsequent scans, to track the object. Other objects and features will be in part apparent and in part pointed out hereinafter.

BRIEF DESCRIPTION OF THE DRAWINGS

FIG. 3 represents a portion of the array shown in FIG. 2;

FIG. 4 is a flow chart illustrating operation of a signal processor of the apparatus by which a target is detected and recognized with a minimum portion of a display array being activated; and, FIG. 5 illustrates a modulation pattern for a xenon beacon with sampling points on the modulation indicated.

Corresponding reference characters indicate corresponding parts throughout the drawings.

DESCRIPTION OF A PREFERRED EMBODIMENT

Figure 1:
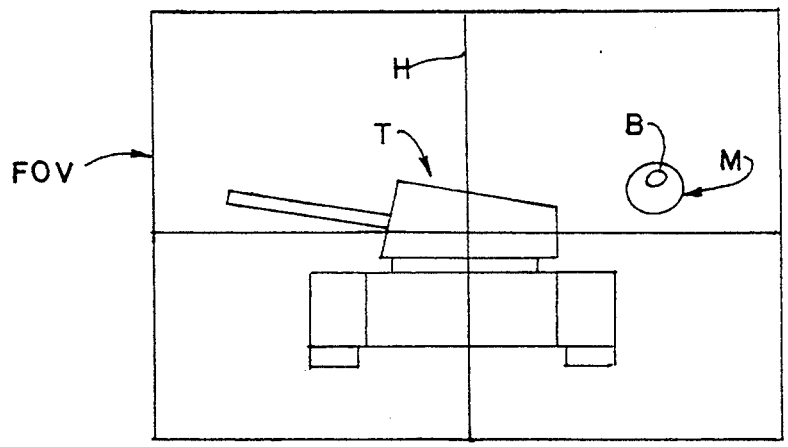
FIG. 1 is an illustration of a prior art missile tracking system including a xenon beacon tracker.

Referring to FIG. 1, a prior art TOW missile tracking system includes means (not shown) establishing a field-of-view FOV observable by a user of the system. For this purpose, the field of view is comprised by a visual display. If a target such as the tank T is present within the display, the user adjusts the field-of-view to train cross-hairs H on the target. When a missile M is launched at target T, it is, as is well-known in the art, wire guided from its launcher to the target. For this purpose, the missile includes a xenon beacon B located on the tail portion of the missile. The beacon emits radiation in the infrared portion of the light spectrum, for example, between 0.6 microns and 2.0 microns. In addition, the beacon's radiation includes a modulation frequency which is classified for security reasons. The system further includes a xenon beacon tracker (not shown) responsive to this modulated infrared radiation to produce an indication on the display of the position of the beacon, and hence the missile. The display must include both the missile and the target. Because beacon B emits light outside the visible portion of the spectrum, an ancillary device such as a television camera, or FLIR, is used obtain an image of the target in the visible portion of the spectrum. The target image is also displayed. For tracking system accuracy, the xenon beacon tracker and camera or FLIR, are boresighted together.

As is described in U.S. Pat. No. 5,062,586, a xenon beacon tracker and a FLIR are incorporated in a sighting unit which is part of a missile tracking system. Prior to missile launch, the gunner locates target T in the display. The target is, for example, at a range up to 2.5-3.0 km. (1.6-1.9 miles) away. Once launched, the missile is initially visible to the gunner because of the exhaust plume produced by the missile burning its onboard fuel supply. As the missile moves downrange toward the target, its size in the display diminishes, and the exhaust plume disappears when the fuel is spent. Continued visual tracking by the gunner is thereafter difficult. However, because of the xenon beacon, the missile is readily located in the field of view by the sighting unit and a representation of the missile's position is provided on the display. This enables the gunner to readily guide the missile all the way to the target.

While this tracking system and methodology works well for its intended purpose, use of both a xenon beacon tracker and a separate optical detector (FLIR) operating in the visible portion of the light spectrum imposes constraints on the system. To avoid tracking errors, the xenon beacon tracker and FLIR must be boresighted together. Further, the effective range of the system is limited by the optical characteristics of both the sighting unit and the gunner's eyesight. Even using optical magnification, the system's effective range is limited.

Figure 2:
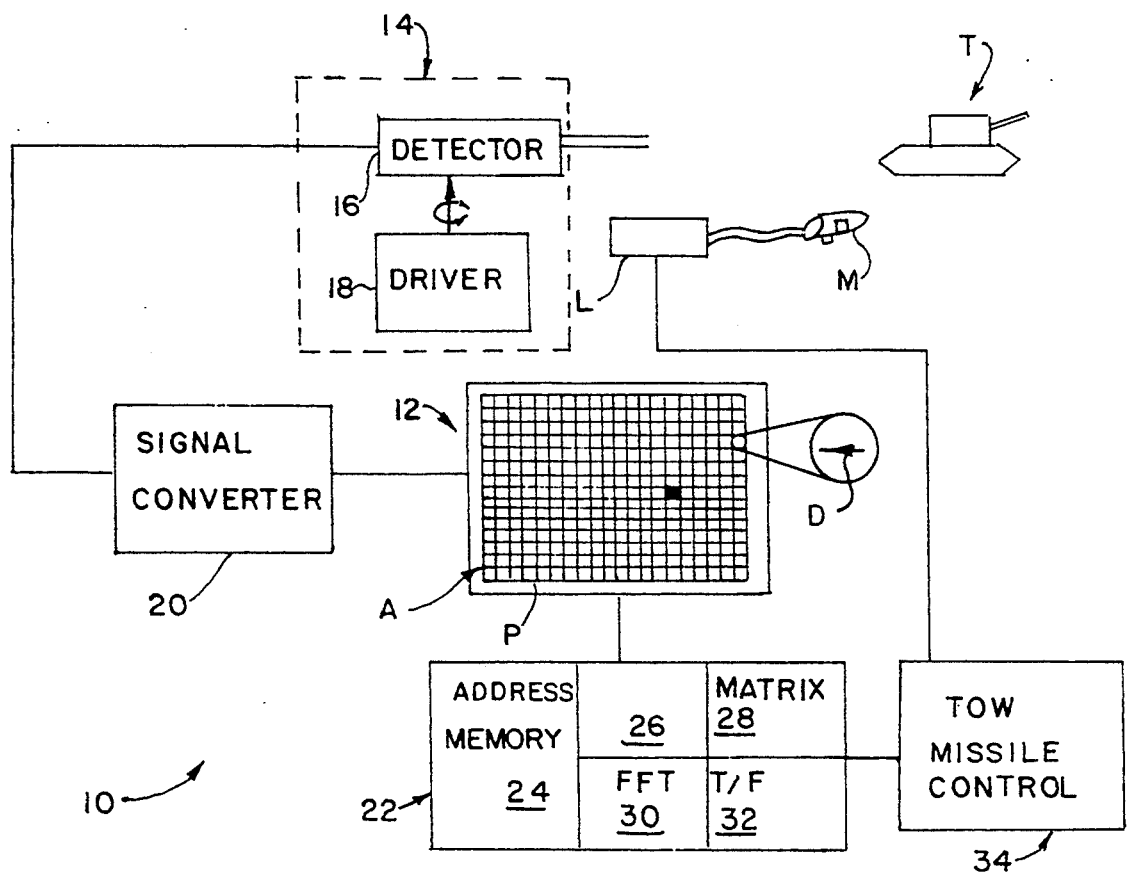
FIG. 2 is a block diagram of the apparatus of the present invention.

Referring to FIG. 2, apparatus 10 of the present invention is for detecting an object such as tank T which is located within the defined field of view FOV. The apparatus is portable and may be mounted on a vehicle such as a tank or a helicopter. Or, the apparatus may be implemented in case or other carrier so to be transportable by a soldier. Apparatus 10 is used in conjunction with, for example, a TOW missile launcher L. The apparatus is designed to identify targets at extreme ranges so the user has the earliest possible warning of the presence of a threat and can prepare to attack the threat before it has the opportunity to attack the user.

Apparatus 10 first includes a search means 12. Means 12 defines the field of view in which a target may be located. As is described in more detail hereinafter, the search means includes an array A of individual elements each of which comprises one pixel P of a visual display. Array A is an N*N array comprised of a plurality of photosensitive diodes D. The array is, for example, a 512 pixel by 512 pixel array. Each of the 262,144 pixels is comprised by one diode, and each diode has a separate, unique address.

Next, apparatus 10 includes a sensing means 14 for repetitively scanning the field of view and for detecting the presence of an object therein. Scanning means 14 first includes a detector 16 for sensing an object by light radiation from the object. Unlike previous systems which require separate detectors for operating in the visible, infrared, or near-infrared portions of the light spectrum, detector 16 is an extended range detector which is responsive to light waves occurring in two of these areas. Thus, detector 16 may be a camera designed to normally operate in the visible portion of the spectrum. Now, however, the optical range of the camera is extended into the near-infrared portion of the spectrum. This allows it to detect the presence of an object regardless of which emitting light in either of these areas of the spectrum. Or, detector 16 is an infrared detector whose range is extended down into the visible portion of the spectrum. Again, the detector is capable of sensing the presence of an object regardless of which portion of the spectrum in which the object emits light. Detector 16 is thus an improvement over earlier detector systems which employed both a visible light detector such as a television camera, and an infrared radiation detector such as the xenon beacon tracker.

In addition to detector 16, means 14 also includes a driver means 18. The driver means rotates detector means 16 back and forth through the field of view. By repetitively scanning the field of view, detector 16 senses the presence of an object at its farthest detectable distance.

Next, apparatus 10 includes a conversion means 20. The conversion means comprises a signal converter responsive to the output of detector 16 to illuminate pixels P of array A. This occurs in response to a scan of the field of view. It will be understood that numerous pixels in the array will be illuminated depending upon the number of light sources currently present in the field of view. Because of the photosensitivity of the diodes, however, the resulting light pattern of the array reflects the intensity of relative intensity of these various sources. Accordingly, the portion of the array corresponding to the location of the TOW missile with its beacon will be brighter than that of a tree, hill, or other background radiation source.

Humans recognize objects primarily by their size and by the contrast between the object and its background. This is also true for a scene viewed through a camera. When an object is viewed through a camera such as a television camera of prior art systems, the primary limitation in object detection, assuming sufficient contrast between the object and the background, is its spatial extent. As a rule of thumb, two lines of a television display are required to detect the object; whereas, six to eight lines are required to recognize it as a particular object. Assuming one line of a television display is comparable to a row of pixels, and assuming a well designed FLIR, the limits of detection and recognition of tank T are linked to the limits of the angular subtense of a particular dimension at a given range. Given, for example, a 2.4 m. (7.9') object dimension (height or width), if the FLIR aperture is 50 mm., the minimum angular subtense for detection is 960 urad. This angle is subtended at a range of 2.5 km. (1.55 mi.). If the minimum area subtense for detection is 3.84 mrads, the range for a 2.4 km. target to subtend this angle is 0.6 km. (0.37 mi.). These values are for a FLIR operating at 10 microns (the center of the 8-12 microns band where most FLIRs operate in a ground environment). For a 10 micron FLIR having an aperture ranging from 50 mm.-240 mm., the minimum resolution is 480 urad.-100 urad.

The following table is indicative of FLIR performance in conventional TOW missile systems. In the table, column A is aperture in mm.;
column B is minimum target angular subtense for detection;
column C is range in km. for a 2.4 m. object to subtend the angle;
column D is minimum target area subtense for detection; and,
column E is range in km. for a 2.4 m. object to subtend this angle.

| A | B | C | D | E |
| --- | --- | --- | --- | --- |
| 50 mm. | 960 urad. | 2.5 km. | 3.84 mrad. | 0.6 km. |
| 100 mm. | 480 urad. | 5.0 km. | 1.92 mrad. | 1.25 km. |
| 150 mm. | 360 urad. | 7.5 km. | 1.44 mrad. | 1.87 km. |
| 200 mm. | 240 urad. | 10.0 km. | 0.96 mrad. | 2.5 km. |
| 240 mm. | 200 urad. | 12.0 km. | 0.8 mrad. | 3.0 km. |

It will be appreciated that while development of the above table requires some simplification, the tabulated results are consistent with the actual performance characteristics of present day FLIRs. Practically, the feasible aperture for cameras used on TOW missile system equipped tanks and armored personnel carriers (APCs) have an upper limit of approximately 200 mm. Given this, the outer limit of detection of an object by the system is approximately 2.5 km.-3.0 km. (1.55-1.86 mi.). For recognition of an object appearing in array A, it has to cover approximately ten pixels.

With the extended range capabilities of detector 16, and those of a processing means 22, as described hereinafter, the apparatus of the present invention is capable of object detection by a single pixel; and object recognition by examining fewer pixels in array A than previously required.

One way of achieving this utilizes a known characteristic or signature of the object. For missile detection, for example, it is known that the xenon beacon carried by the missile is modulated at a certain frequency. As shown in FIG. 5, this modulation is represented as a sinusoid S. It will be understood that while the modulation may be other than sinusoidal, so long as it is repetitive, it constitutes a characteristic signature by which the beacon is identifiable. It will be further understood that if other objects have known, repeatable or continously occurring characteristics, they can be identified by apparatus 10 the same way the apparatus identifies the beacon. And, the processing means performs this recognition in a minimum amount of time. Processing means 22 first includes a storage means, or memory 24 for storing the characteristic signature of a predetermined number of objects. It also has stored a threshhold level of pixel intensity. If a diode exhibits an intensity exceeding this threshhold level, it means the diode represents an object to be investigated rather simply background. The processing means also includes an address storage 26 in which the address of each activated diode D within array A, whose intensity exceeds the threshhold, is stored. Each diode in the array has a unique address $X_n$, $Y_n$.

In operation, for each scan of the field of view by detector 16, a frame of the observed scene is created. For each frame, processing means 22 determines the address position of each activated diode execeeding the threshhold and places this information in address storage 26. Because the address may represent a detected target, this portion of the array is nowevaluated by the processing means to ascertain what is at that portion of the field of view. To do this indeed, the processing means establishes an M*M diode matrix 27 centered about each diode location stored in address module 26. Referring to FIG. 3, an exemplary portion of array A is shown in which the pixel location $X_5$, $Y_5$, includes a diode whose intensity indicates the presence of an object. Matrix generating means 28 now defines a matrix about this pixel address, the matrix being, for example, a 10*10 matrix. The particular address of the diode is at the center of the matrix. Because matrix 27 is approximately 1/250 the size of array A, diode intensity information from each diode in the matrix can be sampled at a very high rate, for example approximately 80 KHz. This is reflected by the data sampling points P indicated on sinusoid S.

The information represented by each diode whose address falls within the matrix is processed by a Fast Fourier Transform (FFT) 30. The FFT is the portion of the processing means which first investigates each activated diode to determine if it represents a detected objected. Since more than one detected object may be present in each frame of the field of view, processing means 22 has a series of sub-frames within each frame for the FFT to successively process the information relative to each matrix (see FIG. 4). For the matrix of FIG. 3, matrix generating means 28 generates the 10×10 matrix 27 in which pixel location $X_5$, $Y_5$ is the center of the matrix.

FFT 30 processes the information included at pixel addresses

| | | | |
| --- | --- | --- | --- |
| $(X_1, Y_1)$, | $(X_2, Y_1)$ | ... | $(X_{10}, Y_1)$ |
| $(X_1, Y_2)$, | $(X_2, Y_2)$ | ... | $(X_{10}, Y_2)$ |
| ... | ... | ... | ... |
| $(X_1, Y_{10})$, | $(X_2, Y_{10})$ | ... | $(X_{10}, Y_{10})$ |

As shown in FIG. 3, an exemplary intensity pattern may show pixel $X_5$, $Y_5$ as being the most intensely illuminated; pixels X₄, Y₄–X₆, Y₄ as the next most intensely illuminated, pixels X₄, Y₅ and X₆, Y₅, as the next most intensely illuminated, and pixels X₄, Y₆–X₆, Y₆, and X₅, Y₇ as the least intensely illuminated.

The sequence of operations performed by the FFT include determining the ratio of intensity between one matrix address and another. Once these ratios are determined, the resultant data is compared with the signature information stored in memory 24. If the data pattern produced by FFT processing is comparable to that of a known object, it is recognized as such. Thus, if the pattern is sinusoidal, and if the frequency of the sinusoid compares with the modulation frequency of xenon beacon B, the processing means identifies it as such. Were the signature that of another object stored in the memory, it would be appropriately identified as that particular. Also, it will be understood that more than object may be detected at a time and that the recognition process may therefore require the designation of multiple matricees. The processing means is capable of performing a multiple recognition process. FFT 30, for example, performs multple operations serially. The order in which the information from the different matricees is processed is determined according to a set of rules stored in memory 24.

Processing means 22 has an interface unit 32 by which the results of the processing are supplied to a TOW missile controller 34. Controller 34 supplies signals to the launcher L for a TOW missile M, for guidance of the missile to the target. TOW missile systems are well known in the art and will not be described. Controller 34 has various inputs of which the output from interface 32 is one. This particular input informs the controller and system user that an object has been detected and identified at a certain location within the field of view. For the beacon B, this information is used for guidance of TOW missile M to its target. If the information were that the object represented a threat, the user of the missile system could employ this information to launch a missile at the target if he deems it a serious threat.

From the foregoing it will be seen that apparatus 10 is advantageous in a number of respects. First, for a detector 16 capable of operating in the visible and infrared portions of the light spectrum, the following table illustrates maximum detection ranges for a 2.4 m. target with one pixel. In the table, column F is aperture size for an 8–12 micron aperture;

column G is detection range in km. for a 2.4 m. object; and, column H is detection range in miles.

| F | G | H |
|---|---|---|
| 50 mm. | 5 km. | 3.1 mi. |
| 100 mm. | 10 km. | 6.2 mi. |
| 150 mm. | 15 km. | 9.3 mi. |
| 200 mm. | 20 km. | 12.4 mi. |
| 240 mm. | 24 km. | 14.9 mi. |

Comparing the results in this table for those of the previous one, it will be seen that there is approximately a fivefold increase in the detection range using apparatus 10.

As previously noted, array A is a starring focal plane array. The array is operated such that any pixel P dwells on its part of a scene for most of a complete field time. This is, for example, 16 msec. Consequently, as discussed with respect to processing means 22, for each frame, one frame field is usable to sub-sample the matrix 27 within the complete array. The diodes within the matrix are sampled at a very high rate, i.e., the 80 KHz rate mentioned previously. This allows the FFT to develop object identification information very quickly. Because the object is detected at an extreme distance from the user, he has much more time to evaluate potential threats than with prior systems.

As a rule, the search matrix is defined so that it represents a 1°×1° area within the field of view. For the sample rate discussed above, the primary limitation in performing an identification is the response time required in addressing the pixels within the matrix. To cover a 1° area of uncertainty for target recognition, the processing time is, for example, approximately 250 msec. If information from more than one matrix is being processed, and if there is an interval between sub-frame processing, FFT 28 sequentially processes information for one or more of the matricees during a portion of a subsequent period.

What has been described is apparatus for achieving target detection at ranges up to five times greater than that of conventional systems. In combat environments, this ability may be crucial to the survivability of both the soldiers and their vehicles. With respect to performance of the apparatus, it is predicated on use of a starring focal plane array. However, optimal performance is also obtainable when other types of arrays are employed. Starring focal plane arrays do have some limitations with respect to array size, array uniformity, and the number and location of dead cells in the array. As noted above, array A is 100×100 pixels and could be smaller With respect to array uniformity, this is a constraint which could be neglected without effecting the overall performance of the array. Basically uniformity is a requirement that each pixel have similar characteristics to its neighbors in the array. However, every pixel the array does not have to exhibit a high degree of uniformity for the array to produce the desired results. As a practical matter, if D* for the array is maximized, a high signal-to-noise ratio for the array is achieved. With respect to dead cells within the array, because, at long ranges, detection information is contained in individual pixels, pixel replication cannot be used. Rather, the diodes used must exhibit excellent operating characteristics.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. Apparatus for detecting an object located within a defined field of view comprising:

search means defining a field of view in which the object may be located, said search means including an array of individual elements each of which comprises one pixel of an observed display, said field of view being in the visible portion of the light spectrum thereby to be displayable to an observer, and said pixel array being comprised of a plurality of diodes each of which has a unique address within the array;

sensing means for repetitively scanning the field of view and for detecting the presence of an object therein;

conversion means responsive to the scanning means for activating pixels in the array in response to a scan of the field of view; and, processing means for searching all the pixels within the array to identify a signature which matches a predetermined characteristic of the object, identification of such signature, even by a single pixel, signifying the presence of the object n the field of view, and the processing means responding to the presence of the object by defining a set of pixels within the array which includes said pixel, and focusing on said set during subsequent scans thereby to identify the object.

2. The apparatus of claim 1 wherein the scanning means comprises:

means for detecting the object by a characteristic thereof which occurs in either the visible or infrared portion of the spectrum, the detecting means being capable of detecting the object regardless of which area of the spectrum in which the characteristic occurs; and, driver means for repetitively moving the detecting means through the field of view.

3. The apparatus of claim 2 wherein the detecting means is an infrared detector adapted to detect objects having characteristics in both the infrared and visible portions of the spectrum.

4. The apparatus of claim 3 wherein the conversion means includes means for converting the input from the detecting means into a signal for activating respective diodes in the array, the location of said diodes corresponding to the position in the field of view where the object is detected.

5. The apparatus of claim 4 wherein the processing means includes means for storing the address in the array of each diode which is activated.

6. The apparatus of claim 5 wherein the processing means further includes a Fast Fourier Transform for processing the information displayed by each activated diode.

7. The apparatus of claim 6 wherein the processing means includes means for storing characteristic information relating to objects, and the Fast Fourier Transform compares this information with that derived from the activated diodes thereby to determine if any activated diode represents detection of an object based upon the sensed characteristic.

8. The apparatus of claim 7 wherein the processing means further includes means responsive to detection of a preselected object to define a diode matrix of predetermined size about said diode.

9. The apparatus of claim 8 wherein the matrix defining means places said matrix defining means defines a matrix in which said diode is at the center of the matrix.

10. The apparatus of claim 8 wherein more than one matrix may be defined at a given time and the Fast Fourier Transform is capable of processing the information from each matrix.

11. The apparatus of claim 1 wherein the array is a starring focal plane array.

12. In a weapon systems for use in a battlefield environment to locate and destroy enemy vehicles, apparatus for detecting an object located within a defined field of view comprising:

search means defining the field of view in which the object may be located, said search means including an array of individual elements each of which comprises one pixel of an observed display of the field of view, said field of view being in the visible portion of the light spectrum thereby to be displayable to an observer, and said pixel array being comprised of a plurality of diodes each of which has a unique address within the array;

sensing means for repetitively scanning the field of view and for detecting the presence of an object therein, said scanning means including means for detecting the object by a characteristic thereof which occurs in either the visible or infrared portion of the spectrum and driver means for repetitively moving the detecting means through the field of view, said detecting means being capable of detecting the object regardless of which area of the spectrum in which the characteristic occurs, and said detecting means is an infrared detector adapted to detect an object having characteristics in both the infrared and visible portions of the spectrum;

conversion means responsive to the scanning means for activating pixels in the array in response to a scan of the field of view; and, processing means for searching all the pixels within the array to identify a signature which matches a predetermined characteristic of the object, identification of such signature, being by a single pixel and signifying the presence of the vehicle in the field of view whereby the object is identifiable at a distance from the weapons system, said processing means including means responsive to the presence of the object by defining a set of pixels within the array which includes said pixel, and focusing on said set during subsequent scans thereby to track the object.

13. The apparatus of claim 12 wherein the conversion means includes means for converting the input from the detecting means into a signal for activating respective diodes n the array, the location of said diodes corresponding to the position in the field of view where the object is detected.

14. The apparatus of claim 13 wherein the processing means further includes means for storing the address in the array of each diode which is activated.

15. The apparatus of claim 14 wherein the processing means further includes a Fast Fourier Transform for processing the information displayed by each activated diode.

16. The apparatus of claim 15 wherein the processing means includes means for storing information relating to predetermined information relating to the characteristics of preselected vehicles, and the Fast Fourier Transform compares this information with that derived from the activated diodes thereby to determine if any activated diode represents detection of a preselected object based upon the characteristic.

17. The apparatus of claim 16 wherein the processing means further includes means responsive to detection of a preselected object to define a diode matrix of predetermined size about said diode.

18. The apparatus of claim 17 wherein more than one matrix may be defined at a given time and the Fast Fourier Transform is capable of processing information from each matrix.

19. The apparatus of claim 12 wherein the array is a starring focal plane array.

20. A method of detecting objects at a distance comprising:

displaying for observation a field of view in which the object may be located, said display of said field of view being comprised of an array of individual elements each of which comprises one pixel of an observable display;

repetitively scanning the field of view for detecting the presence of an object therein including detecting the object by a characteristic thereof which occurs in either the visible or infrared portion of the spectrum, means for detecting the object being capable of detecting it regardless of which area of the spectrum in which the characteristic occurs, including repetitively moving the detecting means through the field of view, detecting the object including use of an infrared detector adapted to detect objects having characteristics in both the infrared and visible portions of the spectrum;

activating pixels in the array in response to a scan of the field of view;

searching all the pixels within the array to identify a signature which matches a predetermined characteristic of the object, identification of such signature being by a single pixel and signifying the presence of the object in the field of view;

responding to the presence of the object by defining a set of pixels within the array which includes said pixel; and, focusing on said set during subsequent scans thereby to track the object.

21. The method of claim 20 wherein the pixel array is comprised of a plurality of diodes and activating pixel in the array includes activating a diode.

22. The method of claim 21 wherein each diode in the array has a unique address and the address of each diode activated in response to sensing of an object corresponding to the position in the field of view where the object is detected.

23. The method of claim 20 further including processing the information derived from the pixel array including storing in a memory the address in the array of each pixel which is activated.

24. The method of claim 23 wherein processing further includes performing a Fast Fourier Transform on the information represented by each activated pixel.

25. The method of claim 24 wherein processing further includes storing in the memory predetermined information relating to the characteristics of preselected objects, and comparing the results of the Fast Fourier Transform with this information to determine if any activated pixel represents detection of a preselected object based upon the characteristic.

26. The method of claim 25 wherein processing further includes means responding to detection of a preselected object to define a matrix of predetermined size about said pixel.

27. The method of claim 26 wherein the matrix is defined an as N×N matrix in which said pixel is at the center of the matrix.

28. The method of claim 27 wherein processing further includes processing the information represented by the pixels in said matrix to obtain a higher resolution of the object.

* * * * *